United States Patent [19]

Ekman

[11] 4,294,473
[45] Oct. 13, 1981

[54] DEVICE AT MUTUALLY LOCKABLE FIRST AND SECOND PARTS

[75] Inventor: Kjell R. Ekman, Zug, Switzerland

[73] Assignee: Ekman Engineering AG, Switzerland

[21] Appl. No.: 129,804

[22] Filed: Mar. 12, 1980

[30] Foreign Application Priority Data

Mar. 20, 1979 [CH] Switzerland ............... 02488/79

[51] Int. Cl.³ ............................................ F16L 55/00
[52] U.S. Cl. ...................................... 285/50; 285/321;
285/332.3; 285/351; 285/356
[58] Field of Search ............... 285/321, 353, 356, 177,
285/357, 351, 12, 387, 388, 50, 332.3

[56] References Cited

U.S. PATENT DOCUMENTS

| | | | |
|---|---|---|---|
| 1,860,759 | 5/1932 | Winton | 285/356 X |
| 2,003,446 | 6/1935 | Imly et al. | 285/356 X |
| 2,443,394 | 6/1948 | Le Clair | 285/388 |
| 2,560,263 | 7/1951 | Wiegand et al. | 285/348 X |
| 2,935,343 | 5/1960 | Ellis | 285/321 X |
| 4,193,616 | 3/1980 | Sorson | 285/321 |

FOREIGN PATENT DOCUMENTS 2706323 8/1977 Fed. Rep. of Germany ...... 285/351

*Primary Examiner*—Dave W. Arola
*Attorney, Agent, or Firm*—Pollock, Vande Sande & Priddy

[57] ABSTRACT

A device for use with a unit fastener including a first coupling part which is lockable to a complementary second coupling part by a locking wire or locking ring actuated by a locking nut or similar. The first coupling part is arranged in a cavity on the unit and the locking nut or the like is designed with a thread or similar via which the nut or the like can be fastened to the unit. The locking nut or the like positions the locking wire or the locking ring while simultaneously holding the first coupling part fastened in the cavity.

10 Claims, 2 Drawing Figures

DEVICE AT MUTUALLY LOCKABLE FIRST AND SECOND PARTS

FIELD OF THE INVENTION

The present invention relates to an improved coupling device intended to fasten a first coupling part to a unit in a fluid-tight manner, the coupling part being lockable to a complementary second coupling part by means of a locking wire or a locking ring which contacts a hollow locking part having a cylindrical similar shape. The locking part is preferably designed as a locking nut. The locking part is intended to interact with the locking wire or locking ring to safely maintain the wire or the ring in a locked position between the first and second coupling parts.

PRIOR ART

It is previously known to fasten a coupling part in a cavity on a unit, for instance by providing the coupling part and the cavity with interactable threads which allow the coupling part in question to be screwed into engagement with the unit.

OBJECT OF THE PRESENT INVENTION

In some cases it is desirable to make the coupling arrangement project as short a distance as possible from the unit. Examples of this are narrow spaces and passages where couplings of the so called plug-in type make possible safely working quick connections between different kinds of connections such as air hoses, fuel pipes, etc.

SUMMARY OF THE INVENTION

The present invention is intended to solve, among other things, this problem and suggests that the first coupling part include a locking part for instance in the form of a first thread which is to interact with one in the unit located at a position corresponding to the locking device, for instance in the form of one at the mentioned cavity arranged second thread. The locking part is at that, in its applied position, arranged to keep the first coupling part in the mentioned cavity and at the same time interact with the locking wire or locking ring of the first and second coupling parts to secure the wire or ring in its locked position between the coupling parts.

In further developments of the concept of the present invention, the first coupling part consists of a female part, and the second coupling part of a male part, where the male coupling part is double-suspended in the female coupling part in two at a distance from each other in the female coupling part arranged sealing elements, for instance in the form of O-rings.

In the mentioned further developments the female coupling part is at least mainly completely countersunk in the cavity and the locking part has the form of a locking nut which by means of an outer thread interacts with an inner thread on the cavity, whereby the locking nut also has an end surface to interact with an opposite end surface of the first coupling part. Furthermore, at the bottom of the cavity a channel terminates concentrically for media, whereby the mouth of the channel is put in connection to the through passage of the female coupling part for the mentioned media when the female coupling part is applied in the cavity. The first coupling part also has outer sealing devices which interact with the unit in the mentioned cavity. The mentioned outer sealing can consist of an elastic sealing ring of one in itself known kind, conical sealing for sealing "material to material", etc.

The first and second coupling parts, the locking part and the locking wire or locking ring are also arranged so the first coupling part first is applicable in the cavity, whereafter the locking part can be put on with the locking wire or locking ring in the unit to a provisional position just before the end position of the locking part is reached in the unit. The second coupling part is then pushed into the first coupling part until the locking with the locking wire or the locking ring will take place, whereafter the locking part is actuated to its end position where it can safely keep the first coupling part pressed in against the bottom of the cavity and where it interacts with the locking wire or locking ring.

When the coupling is disassembled, the locking nut is screwed out, whereafter the male coupling part is removed from the female coupling part.

Distinctive features of the present invention are described in detail in the specification, are shown in the attached drawings and are defined in the claims following hereafter.

By the above described arrangement possibilities for an efficient countersink of the major part of the coupling are achieved.

A simple assembling procedure for the coupling as such to the unit is achieved.

By the present invention it is also possible to obtain a simple installation procedure for "plug-in" couplings of the type described in the Swedish Pat. No. 7705103-5 which uses a locking nut and belonging locking wire or locking ring. By that all the advantages attributed to the mentioned known coupling can be exploited at the present invention.

BRIEF DESCRIPTION OF THE DRAWING

A presently suggested embodiment of a device which shows those for the i invention significant features is described below, while references are made to enclosed drawing wherein.

DESCRIPTION OF THE PREFERRED EMBODIMENT

Figure 1:
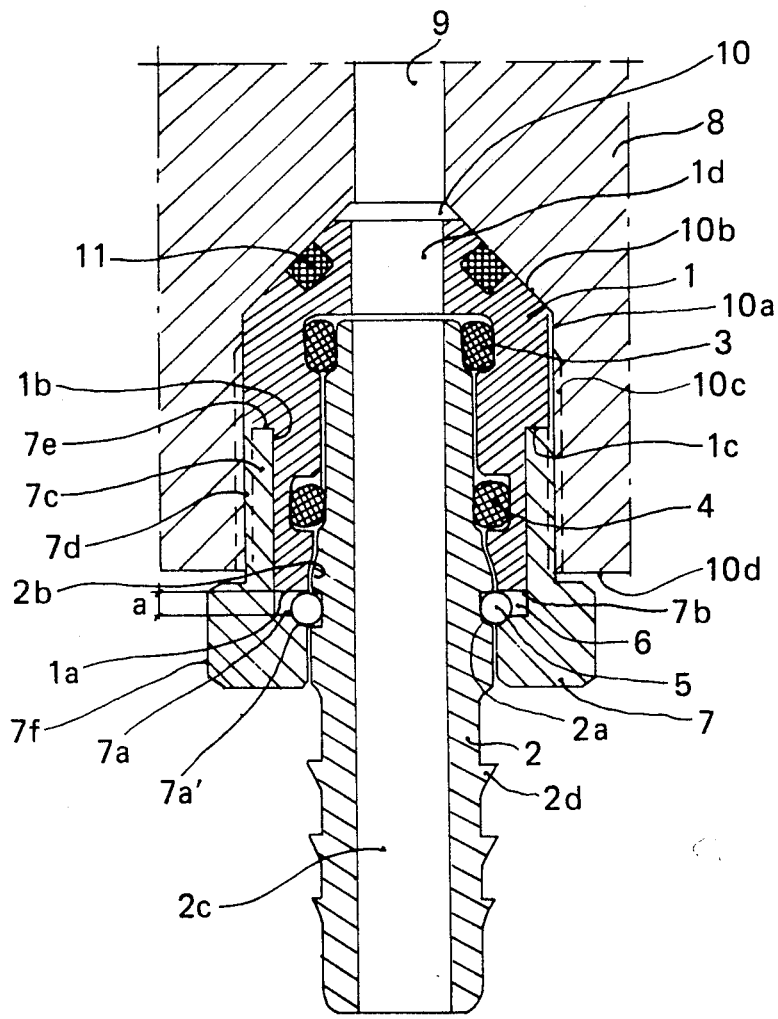
FIG. 1 shows a longitudinal section in a unit countersunk coupling which uses a locking wire or ring allotted locking part in the form of a locking nut.

The coupling device formed according to the present invention is intended to be used for among other things the type of coupling described in the Swedish Pat. No. 7705103-5 comprises a first coupling part in the form of a female coupling part 1 and a second coupling part in the form of a male coupling part 2. The mentioned coupling parts are mutually sealed with sealing elements in the form of two spaced O-rings 3, 4 formed of Nitril, Viton, etc. In a simplified embodiment the two sealing elements are replaced by a single sealing element. For instance the sealing element 4 can be cancelled in the coupling, leaving only the sealing element 3.

The advantages of the specific design of the female and male parts and the location of the mentioned sealing elements are described in detail in the referred-to Swedish patent and shall therefore not be closely dealt with here.

The female and male parts are mutually lockable by a locking wire or ring 5 stretching along a circular arc is in the present case quite smooth and also open. The wire or the ring can be made of music wire or the like.

The male part is provided with a circumferential ring groove 2a for the mentioned wire or ring. The female part includes a corresponding ring groove 6 defined by means of a locking part in the form of a locking nut 7. The mentioned corresponding ring groove 6 is confined by an end surface 1a of the female part, a surface 7a on the locking nut 7 located opposite to the mentioned end surface, and one in the longitudinal direction of the locking nut directed confining surface 7b. Furthermore, the mentioned opposite surface 7a is broken or curved at its inner parts, whereby the broken or curved part of the surface in question is demoted 7a', which is mainly concave and partly follows the curved form of the locking ring section.

Because the locking nut 7 and the male part 1 are mutually slidable in a longitudinal direction during connection, the shape of space 6 will vary i.e. a distance a between the surfaces 1a and 7a will vary during the connection and fastening stage.

Before the male part is to be connected to the female part the distance a must be longer than the section diameter of the locking wire or locking ring so the wire can yield up into the groove 6 when a section 2b of the male part 2 is pressed against part of the wire or ring already positioned between the locking part and the first coupling part. After part 2b is inserted beyond the locking wire or the locking ring it can, due to its inherent spring function, snap down into the peripherical ring groove 2a of the male part. The depth of groove 2a is about half of the sectional diameter of the locking wire or locking ring 5.

After the spring has snapped down, the distance a between the surfaces 1a and 7a is decreased due to the fact that the locking part is actuated in relation to the first coupling part. As a result, the section 7a' contacts and presses the wire or ring 5 into the ring groove 2a independent of the separating forces which after that can arise on the coupling parts 1 and 2, i.e. due to the fact that the distance a in the mutually longitudinally sliding position between the locking part 7 and the first coupling part has become smaller than the section diameter of the wire or the ring, there will be a safe keeping of the wire or ring in its locked position between the coupling parts. As locking surfaces will at that in the first place serve the broken or curved section 7a' and the end walls in the peripherial ring groove 2a.

The coupling parts 1 and 2 are intended to be fastened in a unit 8 having a channel 9, via which media or media pressure is to be led and established, respectively. The mentioned channel 9 terminates concentrically in the bottom of a cavity 10 in the unit. The mentioned cavity can consist of a first conventional drill hole with a straight cylinder shaped wall 10a, and an oblique bottom surface 10b which is achieved by drilling with an concentrical drill. The channel 9 can at that consist of a conventional second drill hole arranged in the first drill hole.

The first drill hole has an inner thread 10c running from the end surface 10d of the unit and down along the main part of the straight wall 10a.

The first coupling part 1 projects into the cavity 10 and has an outer, mainly cylindrically shaped portion, and further includes a cone shaped portion, whereby the cylindrical portion has an outer diameter which is close to the diameter of the cavity and the cone shaped portion has an angle which corresponds to a conical angle for the oblique bottom surface of the cavity 10.

The first coupling part 1 has on its cone shaped section an outer recess for receiving a sealing element 11. The recess consists of a ring shaped outer groove which is located approximately at the half height of the cone shaped part. The sealing element 11 may comprise an ordinary sealing ring of Nitril, Viton, etc.

The cylindrical portion of the first coupling part 1 is at its upper parts, at the outer side, provided with a recess 1b for creating a circular slit shaped space between the first coupling part and the straight wall portion 10a of cavity 10. In the mentioned slit shaped space a hollow cylinder shaped space 7c on the locking nut 7 is located. The mentioned hollow cylinder shaped part has on its outer side a thread 7d, via which the locking nut can be screwed on to the thread 10c of the cavity 10. The mentioned hollow cylinder shaped part also has a smooth inner surface which is in opposite position in relation to an outer surface, also smooth, of the first coupling part, the last mentioned outer surface being the bottom surface of the mentioned recess 1b of the first coupling part.

The hollow cylinder shaped part of the locking nut 7 also has an end surface 7e which interacts with a corresponding surface 1c of the first coupling part, the last mentioned corresponding surface 1c of the first coupling part constituting the confining surface in the mentioned recess 1b on the first coupling part.

The locking nut is in one in itself already known way provided with one to the mentioned hollow cylinder shaped part connected key handle 7f. At the mentioned key handle is arranged one in relation to the hollow cylinder shaped part inwards protruding flange, by which the mentioned space 6 is created.

The first and second coupling parts are provided with through passages 1d and 2c which are arranged on a line in relation to a each other and to the second drill hole 9. The male part has fastening elements 2d for a not shown pipe for the media in question, which fastening elements can consist of reels or the like.

In order to make sure a safe fastening of the coupling in the unit 8, the latter is provided with the drill holes 9 and 10. The female part 1 is arranged in the drill hole 10 and the locking nut 7 with belonging locking wire or locking ring 5 applied, is screwed in via the threads to a provisional position just before the definite final position. The mentioned provisional position is chosen so the space 6 has a width which makes possible the "yielding" spring effect of the open wire or ring 5. After that the male part 2 is brought into the female part 1, during which the passage of portion 2b of the male part past the wire or the ring, this can yield, to in a completely pushed in position of the male and female part snap down into the ring groove 2a by its own spring function. After that the locking nut is tightened definitely to its final position according to the FIG. 1 so that on the one hand the female part 1 is pressed against the bottom of the cavity 10 to achieve a reliable sealing between the unit and the female part, and on the other hand the locking wire or locking ring 5 is pressed down in a safe locking position between the coupling parts via the broken or conical section 7a'. The sealing rings 3 and 4 secures a safe sealing between the female and male parts. In that way a fluid-tight media passageway through the coupling parts between the channel 9 and the hose, pipe, etc. not shown connected to the male part 2 is achieved.

During disassembly of the coupling, the nut 7 is slackened off and removed, allowing the male part 2 to be separated from the female part 1 and the female part 1 to be separated from the cavity 10.

During reassembly, the wire or ring 5 can be removed from the male part 2 and positioned in the groove portion of the locking nut and perform the coupling according to the above. It is, however, also possible to, at the second installation, keep the male part 2, the locking part 7 and the locking wire or locking ring 5 together in one unit which is screwed on to the thread of the cavity via the locking nut with the male part attached via the locking wire or locking ring, whereby the male part is successively forced into its final position in the female part when the locking nut is secured in the thread in question; the securing can at that be performed direct to the final position.

The invention is not confined to the above as an example shown embodiment but may be subject to modifications within the scope of the following patent claims and the invention idea.

The outer sealing between the first coupling part and the unit can be designed in a different way, for instance by a conical sealing where the sealing is made "material to material" without elastic elements in between. Also shoulder sealing is of course possible in this connection. It is also possible to replace the fastening principle for the locking part comprisning threads with one in itself already known type of fastening, for instance bayonet-mounting.

In the above has been described a connecting procedure for the coupling parts where a final tightening (after-tightening) of the locking nut 7 is needed. It is, however, also possible to achieve automatic connection without the mentioned after-tightening. In this case the coupling part 1 is applied in the cavity 10 and the locking nut 7 is screwed on directly to its final position. The space 6 has at that a minimum length a that exceeds the diameter of the locking ring section. The mentioned section 7a is at that concave or bowl-shaped so it follows the form of the locking ring section. When the male part is brought into the female part fastened with the locking nut, the locking ring can expand into the space 6 during passage of the part 2b beneath space 6, and when the ring groove 2a is opposite to the space 6 the locking ring can, according to the above, by its own spring function snap down into the ring groove 2a and perform its locking function for the coupling parts. The inner sealing ring 3 tends to press apart the coupling parts, resulting in the locking ring being pressed against the concave seat created by surface 7a'. If the separating force is increased, for instance due to increased media pressure within the coupling, the locking ring 5 is pressed harder against the concave surface of the section 7a', which counteracts the locking ring being pressed forward and expanding outwards in the mentioned space 6. The last mentioned automatic coupling is preferable in some cases, for instance in connection with rational serial production.

Figure 2:
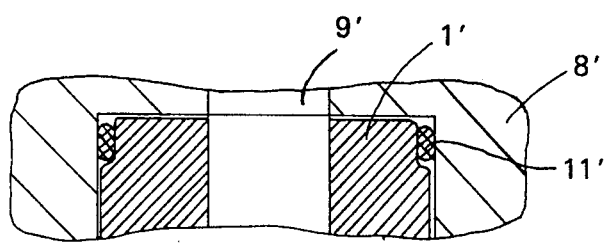
FIG. 2 shows a partial longitudinal section of a modified embodiment for the position of the coupling parts in the unit.

In the embodiment of FIG. 2 the front end of the female part 1' and the inner part of the recess 10 are modified. The front end and the bottom of the recess extend radially with the front end having substantially the same shape as the front end of the coupling part 2 and the sealing ring 11' in the same material as sealing ring 11 is effecting sealing between a countersunk portion of said front end and the even side wall of the recess in unit 9'. Said countersunk portion of the front end can be axially straight or inclined in relation to the axis of the coupling parts. By this embodiment leakage is prevented when nut 7 is released and the medium still is under pressure.

The parts belonging to the new device can suitably be manufactured in a factory in a rational procedure of production. The fastening of the coupling can also be performed in connection to the manufacturing of to different separate equipment, machines, motors, etc belonging units which can be provided with connection outlets or inlets. The final coupling arrangement can be made in connection with the mentioned manufacturing or in one in relation to the latter separate connection. The fastening of the coupling makes possible a simple proceeding in the field in connection with service and the like. Also simple stockkeeping of the different parts of the coupling is made possible.

What I claim is:

1. An improved coupling device for providing a fluid-tight connection between a source of fluid and a hollow conduit unit having an enlarged cavity for receiving said coupling device, and comprising:

a first coupling member having a fluid passageway extending therethrough;

a second coupling member having a fluid passageway extending therethrough;

said first and second coupling members each having on a respective first end portion thereof means for permitting insertion of said second coupling member into said first coupling member, thereby aligning said flow passageways extending therethrough;

at least one sealing ring means compressed between confronting surface portions of said first and second coupling members for preventing the flow of fluid between said coupling members while simultaneously surpressing the transmission of vibrations through said coupling device;

said first coupling member further having on a second end portion thereof means for permitting free insertion of said first coupling member into an enlarged cavity in a hollow conduit unit until said second end portion abuts a portion of an end wall of said enlarged cavity and an exterior surface portion of said first coupling member is radially spaced from a surface portion of said enlarged cavity a distance sufficient to create a substantially cylindrically-shaped slot therebetween;

at least one additional sealing ring means contacting said abutting portions of said first coupling member and said enlarged cavity for preventing fluid from leaking therebetween;

a hollow nut assembly including on a first portion thereof means for permitting insertion of said nut assembly into said cylindrically-shaped slot a sufficient distance such that an end surface of said hollow nut assembly abuts a radially extending wall portion of said first coupling member and a second end portion of said hollow nut assembly overlaps and faces a substantially radially extending end wall of said first coupling member, defining a circumferentially extending locking slot therebetween;

said hollow nut assembly including attachment means engaging complimentary attachment means formed on said hollow conduit unit for fixedly positioning said hollow nut assembly within said substantially cylindrically-shaped slot;

a substantially ring-shaped locking member formed of resilient material extending partially into said circumferentially extending locking slot and confronting a circumferentially extending stop assembly formed on an exterior surface of said second coupling member; and said second end portion of said hollow nut assembly including wall means for engaging and biasing said substantially ring-shaped locking member into tight frictional contact with said stop assembly, thereby preventing inadvertent withdrawal of said second coupling member from said first coupling member.

2. A coupling device according to claim 1, wherein said at least one sealing ring means comprises a resiliently deformable ring-shaped member compressed between a circumferentially extending recess formed in said first coupling member and a countersunk sealing surface formed in a confronting portion of said second coupling member.

3. A coupling device according to claim 1, wherein said at least one sealing ring means comprises a pair of resiliently deformable ring members spaced from one another and compressed between confronting surface portions of said coupling members.

4. A coupling device according to claim 1, wherein said attachment means comprises a threaded exterior surface portion of said hollow nut assembly substantially similar in configuration to a threaded surface portion of said hollow conduit unit confronting said hollow nut assembly.

5. A coupling device according to claim 1, wherein said hollow conduit unit includes a fluid passageway extending from said cavity through a remaining interior portion of said conduit unit.

6. A coupling device according to claim 1, wherein said at least one additional sealing ring means comprises a deformable sealing ring mounted in a circumferentially extending recess formed in an outer surface of said first coupling member, said sealing ring contacting a confronting interior surface portion of said enlarged cavity to prevent fluid flow between said first coupling member and said outlet conduit unit.

7. A coupling device according to claim 1, wherein substantially the entire radially outwardly facing surface of said first coupling member confronts the interior surface of said enlarged cavity.

8. A coupling device according to claim 1, wherein said stop assembly comprises a shallow recess formed in a circumferentially extending exterior surface portion of said second coupling member, said shallow recess having a depth which is less than a diameter of said substantially ring-shaped locking member, such that said locking member projects outwardly from said shallow recess into at least a portion of said circumferentially extending locking slot when radially aligned therewith.

9. A coupling device according to claim 8, wherein said wall means comprises a side wall portion of said hollow nut assembly engaging and biasing said locking member into tight frictional contact with an exterior surface portion of said shallow recess.

10. A coupling device according to claim 8, wherein said side wall portion smoothly curves away from an opposite side of said locking slot as the distance decreases between the side wall portion and the second coupling member, thereby providing a smooth seat for engaging the substantially ring-shaped locking member.

* * * * *